United States Patent [19]
Maier et al.

[11] Patent Number: 5,924,401
[45] Date of Patent: Jul. 20, 1999

[54] SECURITY DEVICE THAT PREVENTS UNAUTHORIZED ACCESS TO A FUEL SUPPLY DEVICE

[75] Inventors: Claus Maier, Ludwigsburg; Carlos Alvarez-Avila, Freiberg; Helmut Haberer, Stuttgart, all of Germany

[73] Assignee: Robert Bosch GmbH, Stuttgart, Germany

[21] Appl. No.: 09/000,120

[22] PCT Filed: Dec. 12, 1996

[86] PCT No.: PCT/DE96/02388

§ 371 Date: Jan. 14, 1998

§ 102(e) Date: Jan. 14, 1998

[87] PCT Pub. No.: WO97/43150

PCT Pub. Date: Nov. 20, 1997

[30] Foreign Application Priority Data

May 15, 1996 [DE] Germany .......................... 196 19 592

[51] Int. Cl.⁶ ..................................................... F02B 77/00
[52] U.S. Cl. ..................... 123/198 B; 137/382; 417/313
[58] Field of Search ....................... 123/198 B; 137/382; 417/313

[56] References Cited

U.S. PATENT DOCUMENTS

| | | | |
|---|---|---|---|
| 3,782,862 | 1/1974 | Cammi | 123/198 B |
| 4,470,769 | 9/1984 | Owens | 417/313 |
| 4,718,828 | 1/1988 | Breeck et al. | 417/313 |

Primary Examiner—Noah P. Kamen
Attorney, Agent, or Firm—Edwin E. Greigg; Ronald E. Greigg

[57] ABSTRACT

A security device in which a cap-shaped element is mounted covering essential functional and/or adjusting elements of a fuel delivery device. The cap-shaped element is connected to the parts of the fuel delivery device that it encloses in such a way that gaining access to the parts or to removing the cap-shaped element is only possible through destructive means and that when a particular destructive force is exceeded, a fracture occurs at a rated break point by means of which a functional or adjusting element or the defining wall that carries this element is fractured in relation to a fuel-carrying space of the fuel delivery device.

24 Claims, 4 Drawing Sheets

SECURITY DEVICE THAT PREVENTS UNAUTHORIZED ACCESS TO A FUEL SUPPLY DEVICE

PRIOR ART

The invention is based on a security device that prevents unauthorized access to a fuel supply device. EP-A1-0 629 532 has disclosed a device of this kind in which a simple cover is provided that encloses an electrical circuit. The electrical circuit includes a solenoid valve, on a fuel injection pump. The cover and the screw connection that joins the cover to the fuel injection pump are disposed so that the screw connection is no longer accessible after the installation of the injection pump. Only by removing the pump can the cover be unscrewed and access be gained to the solenoid valve. In fuel injection pumps, solenoid valves of this kind are used to prevent the supply of fuel to the pump work chambers of the fuel injection pump when the engine is off or is being turned off. Before operation of the engine, a solenoid valve of this kind must be opened. This occurs by means of an electrical control device one part of which is disposed inside the cover in the known embodiment.

If a person wishes to start the engine in an unauthorized manner, this could take place through the manipulation of the solenoid valve. This is only possible, though, if this is also accessible. The electrical circuit disposed beneath the cover prevents the solenoid valve from being easily manipulated from outside the cover. Electrical access to the solenoid valve is denied via a security code and other security measures. A mechanical intrusion could nevertheless render the solenoid valve inoperative and basically bring the solenoid into the open position. As a result, it would be possible to steal the vehicle to which the engine belongs.

The known security device is intended to prevent this unauthorized use by means of the cover provided. The cover provided there, however, is embodied as a simple sheet metal part which nevertheless can be forcibly opened through the use of prying or cutting tools. In that event, it would in turn be possible to directly access the solenoid valve.

ADVANTAGES OF THE INVENTION

The security device according to the invention has an advantage over the prior art in that a functional element (e.g., the solenoid valve) is protected by means of the cap-shaped element against an access, including an electrical holder. The security device protects the electrical access to the solenoid valve and leads to a permanent functional interruption of the fuel delivery device, the moment an attempt is made to forcibly gain access to the functional element. If a particular destructive force is exceeded when an attempt is made to forcibly gain access to the functional or adjusting element, a fracture occurs. Due to the fracture, the adjusting or functional element is rendered inoperative by displacement from the position required for its function. Also, if the defining wall of the fuel-carrying spaces of the fuel delivery device is ruptured, so that fuel can emerge from the spaces, the function of the fuel delivery device is permanently interrupted so that the fuel delivery service cannot be rapidly repaired with ease.

The cap-shaped element assures that a forcible removal of this element through the use of tools is not possible within a predetermined minimum time period. Even when access to the solenoid valve is achieved with a manipulation for a longer time period beyond the above-described security time, operation of the fuel delivery device is permanently prevented.

In one advantageous embodiment, the security device is embodied so that the security device presents a considerable resistance to machining and cutting tools. In particular, manganese steel is extremely impact resistant and difficult to machine down. The security device can also be processed as cast steel so that an optimal shaping is possible for the cap-shaped element, without notch-sensitive edges which could reduce the resistance.

In a further advantageous improvement, a cap-shaped element is internally attached to the enclosed part of the fuel delivery device by means of a screw connection and is protected against being accessed from the outside by means of a part that can only be removed by destroying the part. In the cap-shaped element, these parts can be shaped parts that can be pressed into an exit opening and can only be forcefully removed with extreme difficulty.

In another advantageous embodiment, a connection of the cap-shaped element to the enclosed part of the fuel delivery device is carried out by means of an internal detent connection that can no longer be accessed from the outside. As a result, the cap can only be removed from its installed position by destroying the cap.

Accordingly, the part that has the rated break point is made of a material that is significantly less tough than the material of the cap-shaped element. The constructively predetermined resistance moment assures that in any case, a fracture occurs in the region of the part of the fuel delivery device enclosed by the cap-shaped element before damage occurs to the cap-shaped element itself. In an advantageous manner, the connection between the cap-shaped element and the enclosed part of the fuel delivery device is produced by means of a positive fit connection to a functional or adjusting element. To this end, the functional or adjusting element has detent or positive fit surfaces which engage with detent or positive fit surfaces of the cap-shaped element. These can be screw connections or, e.g., also positive fit connections or snap connections. In this manner, the cap-shaped element can protect a number of functional or adjusting elements from access, e.g. in particular a solenoid valve and an electrical security circuit that controls the solenoid valve and is provided with a security code. The security circuit prevents the electrical access to the functional and adjusting element. The cap-shaped element prevents the mechanical access to the solenoid valve in order to prevent, among other things, an electrical contacting of the solenoid valve bypassing the security circuit, a manipulation of the solenoid valve, or a replacement of this solenoid valve by means of a screw plug.

In a particularly advantageous manner, the connection of the cap-shaped element to the part that the cap-shaped element encloses is carried out on a fitting that has a through conduit to the inside of the fuel delivery device. A rated break point can be realized in a particularly advantageous manner on a fitting of this kind. Advantageously, a fitting of this kind is at the same time a receptacle for a functional or adjusting element that controls essential adjustment functions on the inside of the fuel delivery device. By means of breaking away the support, the wall is advantageously breached toward the interior of the fuel delivery device so that fuel can emerge from its fuel-carrying spaces and consequently an interruption of function of the fuel delivery device occurs. In particular in diesel fuel injection pumps, the inner chamber is used to contain a control pressure, which is comprised of fuel and controls the essential functions of the fuel injection pump. Moreover, the function of a fuel injection pump is very rapidly interrupted if air gets into the inner chamber due to leaks. In a further advantageous improvement, the functional or adjusting element to which the cap-shaped element is connected is an adjusting screw for adjusting the basic setting of the injection in a fuel injection pump. If a screw of this kind fractures at its attachment point, then not only is the inner fuel chamber open in relation to the outside, but also the adjustment of the fuel injection pump is changed so that the associated vehicle can no longer be driven. In the process, the rated break point can also be placed so that a subsequent replugging of the functional or adjusting element, with a makeshift fixing of the seal according to the embodiment according to claim 16, is no longer assured. Furthermore, the required precision of the adjustment by means of an adjusting screw of this kind is high so that as a rule, a makeshift refastening cannot make the fuel injection pump with the associated vehicle operable again. Other advantageous embodiments of the invention are embodied in the dependent claims 19 to 24, which demonstrate various advantageous options for attaching the cap-shaped element to the part of the fuel delivery device enclosed by it.

BRIEF DESCRIPTION OF THE DRAWINGS

Five exemplary embodiments of the invention are shown in the drawings and are explained in detail in the ensuing description.

FIG. 6b shows the associated cap-shaped element for connection to the adjusting screw according to FIG. 6a.

DETAILED DESCRIPTION OF THE DRAWINGS

Figure 1:
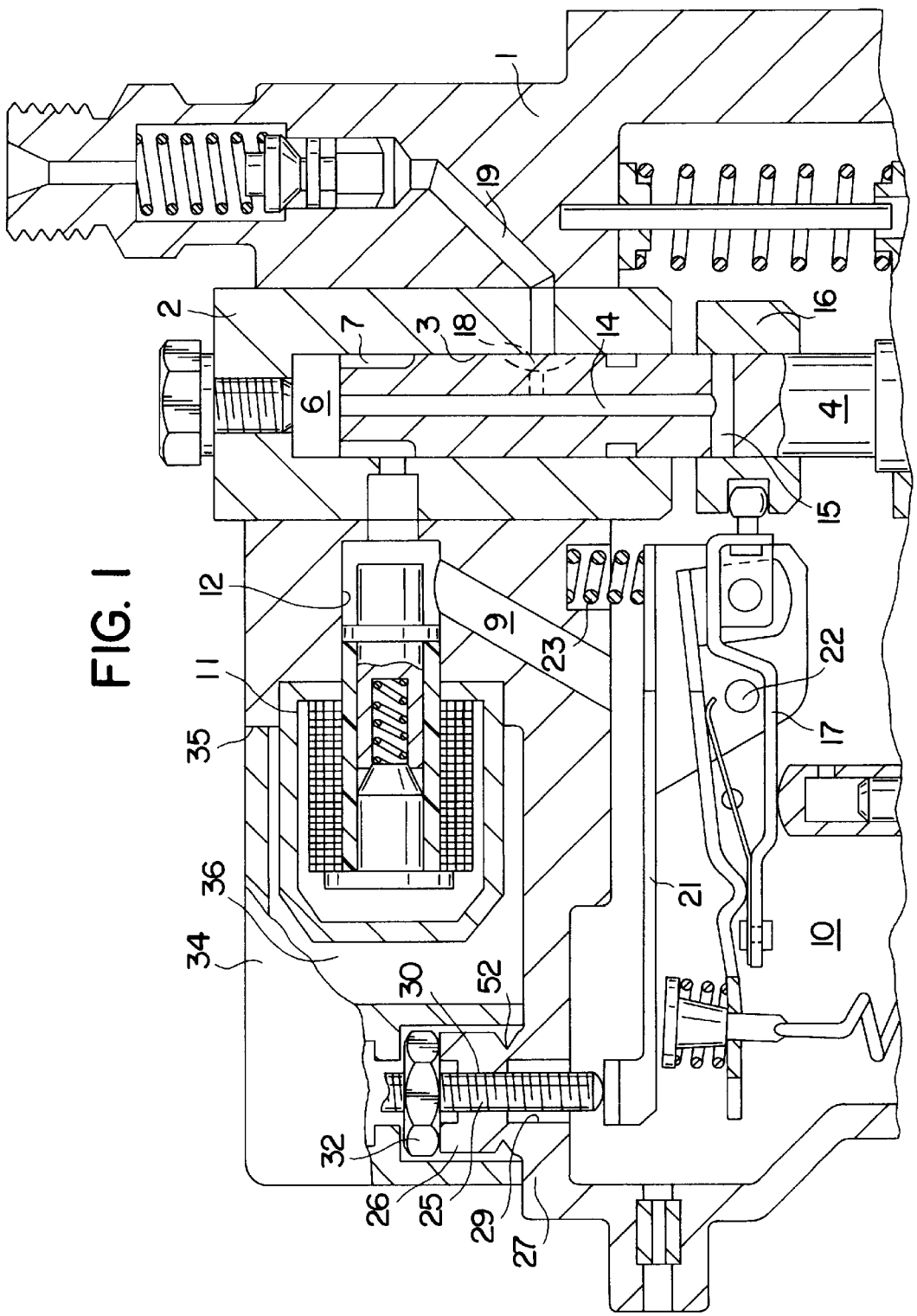
FIG. 1 shows a partial section through a fuel delivery device in the form of a distributing injection pump.

For the intended use in a distributing fuel injection pump, FIG. 1 schematically represents a section through a reciprocating piston distributing injection pump. A bush 2 is inserted into a housing 1 and in its cylinder bore 3, a pump piston 4, which simultaneously functions as a distributing piston, moves in a reciprocating fashion in a manner not shown in detail. On its end face, the pump piston 4 encloses a pump work chamber 6 with the closed end of the cylinder bore 3. The pump work chamber is filled with fuel during the intake stroke of the pump piston via longitudinal grooves 7 and via an intake line 9 that feeds into the cylinder bore 3. The intake line 9 leads from an intake chamber 10 of the fuel injection pump, which is filled with fuel that is regulated to a control pressure. For example, the control pressure is controlled in a speed-dependent or load-dependent manner and is used for controlling an injection onset adjuster which, since it is known, is not shown in detail here. The through flow cross section of the intake line is controlled by means of a functional or adjusting element in the form of a solenoid valve 11 of a known embodiment. The solenoid valve is screwed from the outside into a bore 12 in the pump housing 1. To commence operation, the solenoid valve is excited and opens the intake line 9. To turn off the engine fed by the fuel injection pump, the solenoid valve 11 is closed. The pump work chamber communicates with the intake chamber 10 via a longitudinal conduit 14. The conduit 14 extends in the pump piston, starting from its end face, and via a lateral bore 15 in a part of the pump piston that protrudes into the intake chamber 10. The feeding is controlled by means of a control valve 16 of the fuel injection pump. The valve can be adjusted by a control lever 17. Depending on the axial position of the control valve, which slides in a sealed fashion on the jacket face of the pump piston, the pump work chamber is opened earlier or later during the pressure stroke of the pump piston so that the pump work chamber is relieved through the ending of a high pressure injection. For the high pressure injection, the longitudinal conduit 14 communicates via a distributing groove 18 respectively with an injection line 19 during the respective stroke of the pump piston. The injection line 19 leads to a fuel injection valve not shown in further detail here. In the course of the rotation of the pump piston, in each pump piston stroke, one after the other, another injection line 19 respectively comes to coincide with the distributing groove 18.

The control levers used to actuate the control valve 16 are supported on an adjusting lever 21 which can be pivoted around a stationary axis 22 counter to the force of a spring 23. To adjust the pivot position of the adjusting lever, which adjusts the initial position of the control valve 16 by this pivot position, an adjusting screw 25 is provided as the functional or adjusting element and is screwed into a fitting 26 of the defining wall 27 of the intake chamber 10. The fitting has a through bore 29 with an internal thread 30 into which the external thread 31 of the adjusting screw 25 is screwed. To fix the screw-in depth of the adjusting screw, a lock nut 32 is screwed onto the external thread 31 and is supported against the end face of the fitting 26.

The representation up to this point of the fuel injection pump according to FIG. 1 corresponds to a conventional, known distributing injection pump of the reciprocating piston type in which an access to the solenoid valve 11 is now intended to be prevented. After the fuel injection pump or the associated engine is shut off, an unauthorized person cannot make the fuel injection pump functional again by means of supplying current to or manipulating the solenoid valve by replacing the intake line 9 while in the open state. This can also occur, e.g., as a result of the fact that the solenoid valve is unscrewed from the bore 12 and this bore is closed by a screw plug. A cap-shaped element 34 is provided as an aid to the screw plug and adjoins flush against the housing surface 35 of the housing of the injection pump, and on the inside, together with the housing surface, encloses the solenoid valve 11 as a functional or adjusting element. The attachment of the cap-shaped housing is carried out on the end of the adjusting screw that protrudes from the fitting 26, which adjusting screw likewise represents the functional or adjusting element. This attachment is shown in detail and in various embodiments in the subsequent FIGS. 2 to 6b. Furthermore, inside the inner chamber 36 that is formed between the housing surface 35 and the cap-shaped element 34, a security circuit 180 is provided, which is indicated in FIG. 6b and is inserted between the solenoid valve 11 and an electrical control and/or supply line not shown in detail here. This security circuit permits an excitation of the electromagnet of the solenoid valve only under particular conditions. The security circuit can, for example, be a security code which assures that only the authorized user can turn on the fuel injection pump in order to in turn operate an internal combustion engine or an associated motor vehicle.

Figure 2:
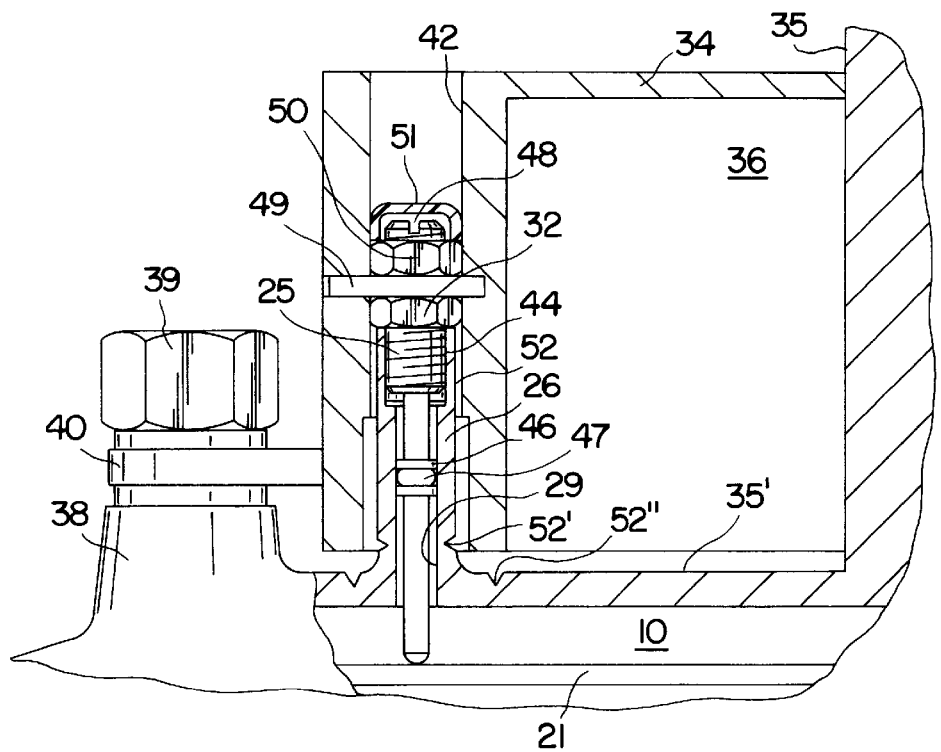
FIG. 2 shows a section through the cap-shaped element according to the invention, with its connection to a functional or adjusting element in a first embodiment.

FIG. 2 shows a first exemplary embodiment of the cap-shaped element 34 according to the invention. As is clear, this element adjoins flush against a housing surface 35 that is shown as vertical here, into which surface, for example, the bore 12 from FIG. 1 is let. The bore, however, together with the solenoid valve is not shown in detail here. The housing surface 35' that extends at a right angle to the housing surface 35 has the fitting 26 and has another fitting 38, which is disposed outside the cap-shaped element and into which a bolt 39 is screwed. This is used to fasten a tab 40 to a through bore, not shown further here. The tab is of one piece with the cap-shaped element 34 and protrudes out from the cap-shaped element at right angles. In the section in the cap-shaped element 34, which along with the housing surfaces 35, 35' encloses the internal chamber 36, a recess is visible in the form of a through bore 42 for receiving the fitting 26 and the part of the adjusting screw 25 that protrudes out from this fitting. The fitting 26 has the internal thread 30 into which the external thread 31 of the adjusting screw 25 is screwed so that the part of the adjusting screw that adjoins the external thread protrudes through the through bore 29 of the fitting into the intake chamber 10 and serves as a stop there for the adjusting lever 21, as mentioned in relation to FIG. 1. To seal the intake chamber 10 in relation to the outside, a toroidal sealing ring 47 (O-ring) is inserted onto the adjusting screw between two collars 46, and toward the inner wall of the through bore 29 of the fitting 26. In the region between the internal thread 30 and the entry of the through bore into the intake chamber 10, this O-ring seals the intake chamber in relation to the outside. For adjustment purposes, the adjusting screw has a slot 48 on its external end face and in the adjusted position, the adjusting screw is then secured with the lock nut 32. In this state, the cap-shaped element is guided via the adjusting screw and in the inner wall of the through bore 42, has a securing ring that protrudes into the bore 42 or has a securing pin 49 that extends through the through bore 42 laterally. This securing ring or securing pin 49 is disposed in direct proximity to the nut 32.

Then a screw-on part or a second nut 50 is screwed onto the threaded end of the adjusting screw so that the securing ring or securing pin comes to rest between the two nuts and prevents the cap-shaped element 24 from being able to be removed again. In order to prevent access to this screw-on part 50, a locking cap 51 is pressed into the through bore and adjoins the inner wall of the through bore 42 in a flush manner. This locking cap can only be removed from the through bore again by destroying it.

In the described manner, a firm connection is produced between the cap-shaped element 34 and a part of the fuel delivery device enclosed by the cap-shaped element, which connection can no longer be subsequently disconnected with ease. The additionally provided tab 40 only serves the relatively movable fixing of the cap-shaped element in the installation position and to relieve the attachment point in the part of the fuel delivery device enclosed by the cap-shaped element. If the cap-shaped element 34 is now manipulated, the tab 40 is the first thing to break, without the cap-shaped element thus being able to be removed from its installed position. The positive fit connection to the housing of the fuel delivery device furthermore prevents the cap-shaped element from being rotated. If the cap-shaped element is manipulated further with the intent of removing it, then the fitting 26 is designed so that when force is applied, it fractures at a rated break point 52 on the fitting. This rated break point is preferably disposed in the region between the thread 30 and the continuing through bore 29 of the fitting 26 in the direction of the intake chamber 10. Dispositions of rated break points 52' or 52" in the region of the transition between the fitting 26 and the defining wall 27 are also advantageous. When the fitting 26 fractures, then the cap-shaped element 34 can in fact be removed and it would be possible to gain access to another functional or adjusting element, e.g. the solenoid valve 11, but due to the fracture, now the defining wall 27 of the intake chamber 10 is destroyed at the location of the fitting 26 so that fuel can escape here. Even if the adjusting screw 25 is subsequently reinserted at this location, the adjusted position cannot be easily reproduced so that as a rule, the basic adjustment of the fuel injection pump is changed here in such a way that the driveability of an internal combustion engine with this fuel injection pump is no longer assured. If the rated break point is disposed above the toroidal sealing ring, then a sealing of the intake chamber 10 in relation to the outside would still be possible. If, however, the rated break point is disposed preferably between the intake chamber 10 and the seal by means of the toroidal sealing ring 47, then it is not easily possible to reinstate the leak-proofness of the defining wall 27. In any case, a repair requires a considerable expenditure of time, which is provided as a security period. The security device according to the invention is not correspondingly intended in principle to prevent an access to the functional or adjusting elements, but is intended to prevent the access within a security period in such a way that the vehicle associated with the fuel delivery device can be rendered operational within this period.

Because of these rated break points 52' or 52", which are provided in the region of the defining wall 27 directly adjoining the fitting 26, it is highly questionable whether the fuel injection pump can be made leak proof and therefore operational again. In this instance, an adjustment of the adjusting element and a sealing of the intake chamber would be even more difficult. Due to the leakiness, as a rule air gets into the intake chamber 10 and leads directly to an interruption of function of the fuel injection pump or the necessary control pressure then cannot build up for the uninterrupted operation of the fuel injection pump and the internal combustion engine associated with it.

Figure 3:
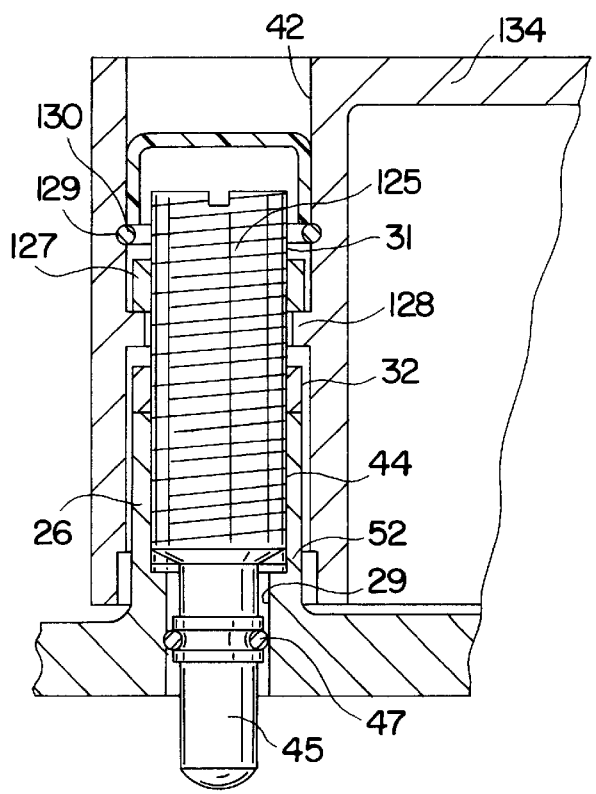
FIG. 3 shows the embodiment of the connection of the cap-shaped element to an adjusting element in a second embodiment.

In the exemplary embodiment according to FIG. 3, an adjusting screw 125 is provided that serves as a functional or adjusting element and has an external thread 31. The adjusting screw is screwed into the internal thread 44 of the through bore 29 of the fitting 26, analogous to the exemplary embodiment according to FIG. 2. The bolt-shaped part 45 of the adjusting screw 125, which adjoins the external thread 31 toward the intake chamber 10, in turn carries the toroidal sealing ring 47, which together with the through bore 29 produces the seal in relation to the outside. To secure the screw-in depth, the nut 32 is in turn screwed onto the adjusting screw 125 and is supported on the end face of the fitting 26. Between this nut 32 and the screw-on part 127, an annular rib 128 protrudes from the inner wall of the through bore 42 into the interior of the through bore 42 in such away that the cap-shaped element 134 can only move within the scope of the play between the nut 32 and the screw-on part 127. As an additional securing measure, on the end of the screw-on part 127 remote from the intake tube 10, a snap ring 130 is snapped into an internal annular groove 129 of the through bore 42 and prevents the screw-on part 127 from being able to be unscrewed. Then, as in the exemplary embodiment according to FIG. 2, the through bore 42 is locked by the locking cap 51, which is driven in until it meets the snap ring 130 that serves as a securing ring. In this instance, the rated break point 52 is also provided at the transition between the internal thread 44 and the adjoining part of the through bore 29 that extends in the direction of the intake chamber 10.

Figure 4:
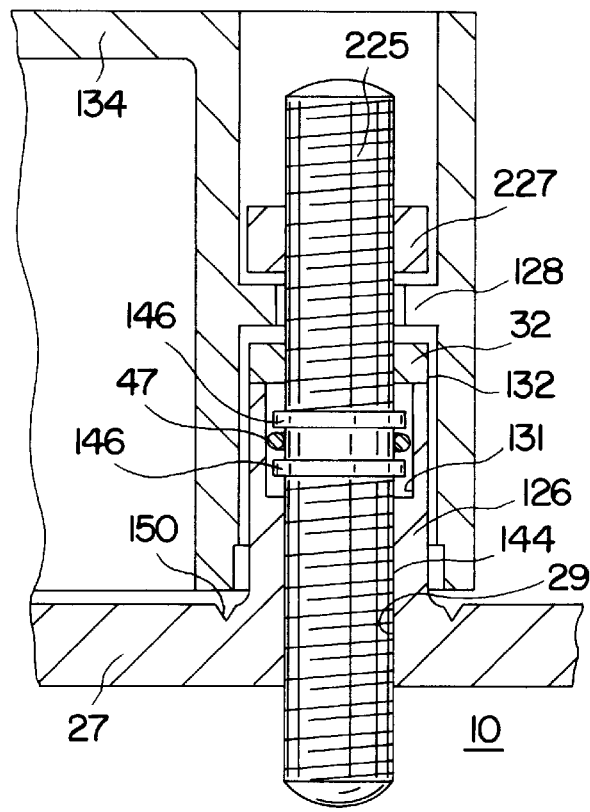
FIG. 4 shows the connection of the cap-shaped element to an adjusting element in a third embodiment.

In the embodiment according to FIG. 4, the cap-shaped element 134 is embodied in the same way as in the exemplary embodiment according to FIG. 3, with the annular rib 128 that comes to rest between the nut 32 and the screw-on part 127. In the exemplary embodiment according to FIG. 3, the internal thread 144 is now disposed in the part of the through bore 29 that directly adjoins the intake chamber 10. The seal is produced in a diametrically enlarged part 131 of the through bore 29 that adjoins this, which issues forth at the end face 132 of the fitting 126. Inside this diametrically enlarged part 131, the adjusting screw 225 now has the collars 146 known from the exemplary embodiment according to FIG. 1, between which the toroidal sealing ring 47 is inserted as a seal. The rated break point in this exemplary embodiment is embodied as an indentation 150 in the defining wall 27 in such a way that in an annular fashion, the indentation directly adjoins the diameter of the fitting 126. With this construction, therefore, a fracture occurs directly in the defining wall 27 which is intended to enclose the fuel-carrying intake chamber 10. In this exemplary embodiment, the sealing in relation to the intake chamber 10 is disposed on the other side of the rated break point 150 so that a reinsertion of the broken fitting 126 together with the adjusting screw 225 can no longer produce a sealing of the defining wall 27. There is the further advantage that with a broken wall, it is even more difficult to bring the broken part precisely back into its original position so that the required initial adjustment of the fuel injection pump would be reinstated. A fuel injection pump that has been damaged in this way cannot be operated for a long period of time.

Figures 5A, 5B:
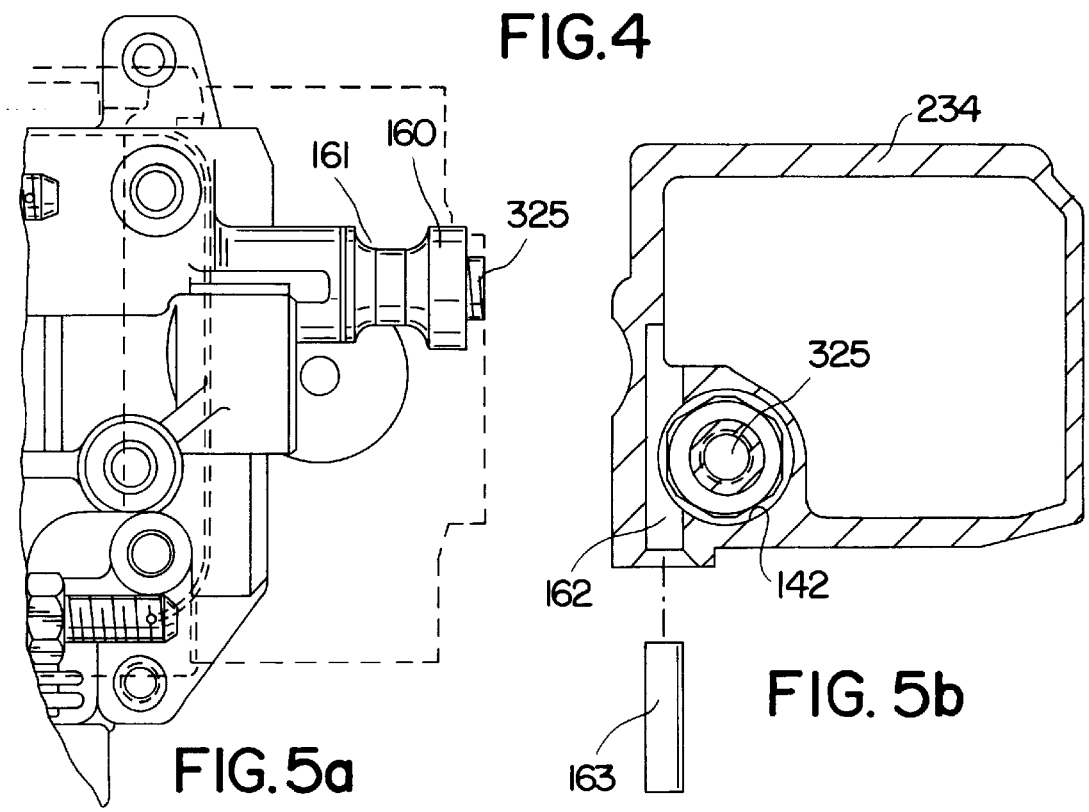
FIG. 5a shows a fourth embodiment 30 with a version of the connection of the cap-shaped element to an adjusting screw of a fuel injection pump.
FIG. 5b shows a section through the cap-shaped element, which is provided for connecting to the adjusting screw according to FIG. 5a, FIG. 6a shows a fifth embodiment of the connection of the cap-shaped element to the fuel delivery device in the form of a snap connection.

In the fourth exemplary embodiment according to FIGS. 5a and 5b, the lock nut 160, which had the function of the lock nut 32 in the preceding exemplary embodiments, is provided with an annular groove 161 that leaves space for a pin to be driven into the cap-shaped element 234 lateral to the axis of the adjusting screw 325, as shown in FIG. 5b. In a section through the center of the annular groove 161, perpendicular to the axis of the adjusting screw 325, FIG. 5b shows that a blind bore 162 is provided in the cap-shaped element 234. The blind bore intersects the through bore 142 of the cap-shaped element and whose position in relation to the axis of the adjusting element 325 is such that a pin 163 that engages flush in the annular groove 161 can subsequently be driven into the blind bore 162. Due to the embodiment as a blind bore, the pin cannot be taken out by means of being driven in further and if need be, it could be drilled out. Therefore the pin 163 is embodied as a hardened steel pin which cannot easily be drilled out. The cap-shaped element itself is comprised of a tough material that is difficult to machine down, e.g., manganese steel, austenitic manganese steel, or crucible cast manganese steel. This property achieves the fact that the comparatively more brittle material of the defining wall or of the fitting fractures at the rated break point before the cap-shaped element is destroyed.

Figure 6A:
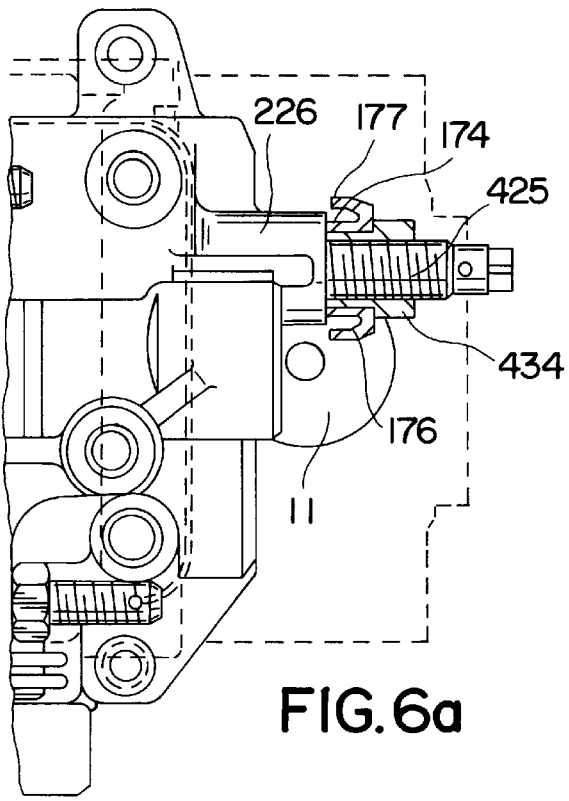
Figure 6B:
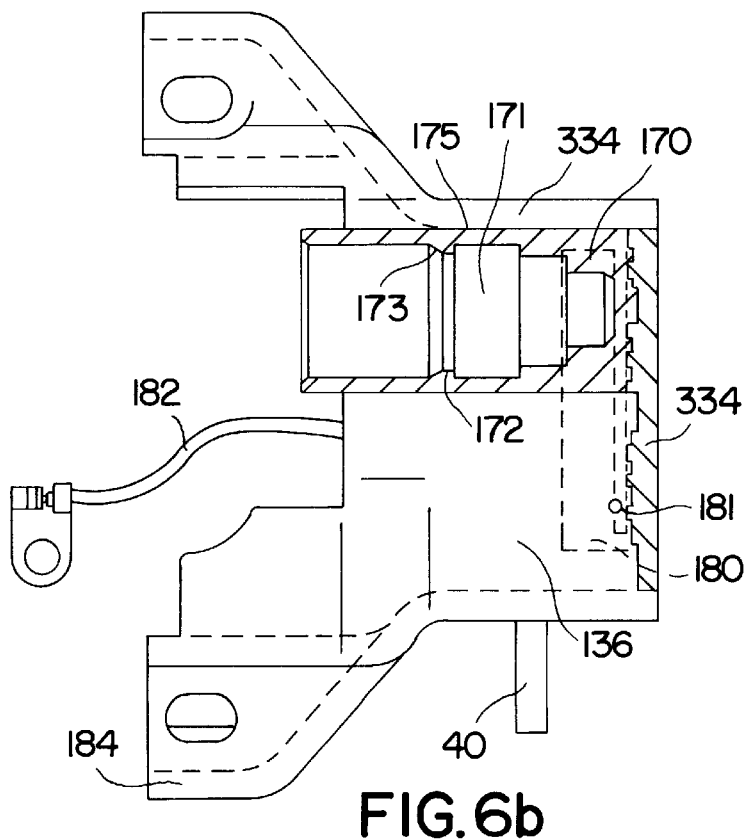

In the last exemplary embodiment according to FIGS. 6a and 6b, the cap-shaped element 334 is connected on its inside with a bowl-like part 170 whose inner space 171 is adapted to the outer contour of the adjusting screw 425 and the lock nut 434, which protrude out from the fitting 226. Furthermore, the bowl-like part 170 has an annular collar 172 which protrudes into the inner space 171 and has an insertion bevel 173 oriented toward the fitting 226. Between the lock nut 434 and the end face 174 of the fitting 226, a detent element 176 is provided, with resilient arms 177 that point toward the fitting 226 and when the cap-shaped element 33 is slid onto the adjusting screw 425. The resilient arms 177 slide via the insertion bevel 173 and engage with the detent face 175 of the annular collar 172, which face is disposed opposite from the insertion bevel 173. A cap-shaped element 134 that is detent connected in this manner to the fuel delivery device can only be removed again by destroying the cap-shaped element. The solenoid valve 11 comes to rest in the inner space 136 next to the bowl-shaped part 170. The security circuit 180 is also disposed in this inner space and consequently is also no longer accessible and is only connected to the environment by means of a small line-carrying opening 181. FIG. 6b also shows the connecting cable 182 to the solenoid valve 11. In addition, the cap-shaped element can also be connected via a flange 184 in a vibrationally secure manner to the fuel delivery device or the fuel injection pump.

The foregoing relates to preferred exemplary embodiments of the invention, it being understood that other variants and embodiments thereof are possible within the spirit and scope of the invention, the latter being defined by the appended claims.

We claim:

1. A security device for preventing unauthorized access to a functional element that protrudes from a defining wall (27) of a fuel supply pump, comprising a cap-shaped element (34) that is affixed to the fuel supply pump, said cap-shaped element covers the functional element that protrudes from the defining wall (27) and, together with the defining wall (27, 35) encloses said functional element, the cap-shaped element (34) is connected to the fuel supply pump in such a way that a removal of the cap-shaped element from the fuel supply pump is only by destructive means and a rated break region is additionally provided on the defining wall (27) that carries said functional element and that together with the functional element defines a fuel-carrying chamber (10) of the fuel supply pump.

2. The security device according to claim 1, in which the cap-shaped element (34) has at least one positive fit connection to a part of the fuel delivery device enclosed by the cap-shaped element (34), said connection is protected from access, and is comprised of a tough material that is difficult to machine down.

3. The security device according to claim 2, in which the connection is a screw connection that is protected from access by means of a part that can only be removed by destroying the part.

4. The security device according to claim 2, in which the connection is an internally disposed detent connection (172, 176).

5. The security device according to claim 2, in which the connection is a positive fit connection that is protected from access by means of a part (49, 51, 163) that can only be removed by destroying the part.

6. The security device according to claim 2, in which the part (26, 27) that has the one rated break point (52) is embodied of a material that is significantly less tough than the material of the cap-shaped element (34).

7. The security device according to claim 6, in which the enclosed part contains the functional or adjusting element

(25) via which the positive fit connection is produced between the cap-shaped element (34) and the enclosed part.

8. The security device according to claim 7, in which in order to produce the positive fit connection of the cap-shaped element (234, 334) and the functional element (325, 425), said functional element is provided with a detent (176) or positive engagement faces (161) which are engaged by a detent (175) or positive engagement faces (163) of the cap-shaped element (234, 334).

9. The security device according to claim 7, in which the cap-shaped element (35, 35, 127) encloses a number of functional elements together with the wall of the fuel delivery device.

10. The security device according to claim 9, in which an electrical signal is used to bring a second functional element (11) into one of two positions that permits an operation of the fuel delivery device as well as a non-operational position.

11. The security device according to claim 10, in which the second functional element is a solenoid valve (11) which is associated with a security circuit (180) that is likewise encapsulated by the cap-shaped element.

12. The security device according to claim 7, in which the functional element that has the at least one positive fit connection of the cap-shaped element with the enclosed part is inserted into a through conduit (29) in a fitting (26) formed onto the wall of the fuel delivery device and is connected with a positive fit to a part of the fitting (26) and a rated break point (52, 52 , 52 , 150) is provided between this part of the fitting and a region of the fitting close to the wall.

13. The security device according to claim 12, in which the functional element (25) is an adjusting screw that is secured in an adjusted position by means of a lock nut (32) that is supported on the fitting (26).

14. The security device according to claim 13, in which with the adjusting screw a basic adjustment of the injection is performed in a fuel injection pump, and by removal of the adjusting element, the adjustment of the fuel injection pump switches over into an extreme position that prevents operation of an internal combustion engine and the associated vehicle, which are supplied by the fuel injection pump.

15. The security device according to claim 13, in which the rated break point (52) between the thread (30, 44) of the fitting (26) and the remaining part of the fitting is provided toward the wall (27) of the fuel delivery device.

16. The security device according to claim 15, in which a sealing element (47) is disposed on the adjusting screw (52) and seals the through conduit (29) in relation to the outside when the adjusting screw is inserted.

17. The security device according to claim 16, in which the sealing element (47) is provided at a point of the adjusting screw (225) which is disposed in the region of the part that fractures at the rated break point (150).

18. The security device according to claim 15, in which for the positive fit connection with the adjusting screw (125), the cap-shaped element (134) has a through bore (42), that contains the fitting (26) and the adjusting screw that protrudes out from said fitting, an annular rib (128) is provided in said bore (42), said annular recess is enclosed between the lock nut (32) and an additional screw-on part (127) on the adjusting screw (125).

19. The security device according to claim 18, in which the screw-on part (50, 127) is covered by means of a locking cap (51), said locking cap, inserted into the recess from an outside and on a side oriented toward the adjusting screw, has one of a detent or a clamping means that is enclosed in the recess (42) by means of the locking cap.

20. The security device according to claim 19, in which between the locking cap (51) and the screw-on part (127), which is a nut, a split washer (129) is snapped into an annular recess in the wall of the recess.

21. The security device according to claim 20, in which the cap-shaped element has an additional positive fit connection in the form of a tab (40) that protrudes from the element, and said tab is screwed to the wall (27) of the housing of the fuel delivery device.

22. The security device according to claim 15, in which for the positive fit connection of the cap-shaped element to the adjusting screw, an elastically locking detent element (176) is screwed onto this adjusting screw and the recess in the cap-shaped element is embodied as a blind bore (171), which has a opposing face (175) to the elastically locking detent element (176) in order to form a detent connection.

23. The security device according to claim 15, in which for the positive fit connection of the cap-shaped element to the fuel delivery device, a blind bore (162) that intersects the recess (142) is provided on the cap-shaped element (234) and a positive fit element (49, 163) is pressed flush into this blind bore and engages behind a shoulder (161, 32) on the functional element or on the fitting.

24. The security device according to claim 22, in which a nut (160) is screwed onto the adjusting screw (325), a recess (161) that is disposed lateral to the axis of the adjusting screw is let into the circumference of this nut, and a blind bore (162) is disposed in the cap-shaped element, intersecting the recess in the cap-shaped element, and a pin (163) that engages in the recess on the nut can be pressed into the blind bore.

\* \* \* \* \*